Nov. 27, 1934.   W. G. HOELSCHER   1,982,612
FEED BOX TRANSMISSION
Filed Aug. 17, 1932   8 Sheets-Sheet 2

INVENTOR
William G. Hoelscher
BY
Wood & Wood
ATTORNEYS

Nov. 27, 1934.  W. G. HOELSCHER  1,982,612
FEED BOX TRANSMISSION
Filed Aug. 17, 1932   8 Sheets-Sheet 4

Fig. 7.

INVENTOR
William G. Hoelscher
BY Wood & Wood
ATTORNEYS

Nov. 27, 1934.  W. G. HOELSCHER  1,982,612
FEED BOX TRANSMISSION
Filed Aug. 17, 1932   8 Sheets-Sheet 6

INVENTOR
William G. Hoelscher
BY
Wood & Wood
ATTORNEYS

Patented Nov. 27, 1934

1,982,612

UNITED STATES PATENT OFFICE 1,982,612

FEED BOX TRANSMISSION

William G. Hoelscher, Norwood, Ohio, assignor to The American Tool Works Company, Cincinnati, Ohio, a corporation of Ohio Application August 17, 1932, Serial No. 629,163

13 Claims. (Cl. 74—333)

This invention relates to lathes and is particularly directed to a feed box or carriage transmission gearing. The type of lathe particularly concerned is that in which the feed gearing extended to the carriage is designed for obtaining appropriate thread cutting leads or pitches and carriage feed through the use of a cone of gears, this cone of gears being driven from the headstock and in conjunction with which, a means is included adapted to connect the power either to a lead screw or a feed rod. This improved gearing has been particularly applied to a lathe but the principles involved can be utilized in other machine tools where the problems are analogous.

The present invention is particularly concerned with the fact that thread cutting leads and carriage feeds vary as to practice and convention, a metric thread and feed being used in some instances and a United States standard thread or feed in others. Consequently, it is a general object of this invention to provide an improved feed box transmission for translating the carriage of the lathe and for thread cutting operations, which transmission will function equally well for either type of thread cutting, the particular purpose being to accomplish the change in drive for the two types of thread cutting or feed entirely in the feed box with very little effort and without substantially any interference with the normal driving connection from the headstock and in this application to provide a feed gearing which is extremely simple. The present gearing is also readily adaptable for cutting threads in diametrical pitch leads, module leads and any special leads. More specifically, the object is to effect through the use of two shafts, one a cone gear shaft and the other a tumbler shaft, an inversion of the drive transmitted from these two shafts by transfer of the power source from one to the other by an extremely simple gear transposition and shift.

It is another object of this invention to transmit the invertible drive in either speed value, accomplished by the inversion, to the feed screw and lead screw in a series of ranges by multiplying the changes obtainable through the cone of gears.

It is a further object to accomplish alternate driving of the feed screw and feed rod by the same multiplication of power or speed ranges through the use of a single lever which in one phase of movement directs the power or speed ranges to the lead screw and in the other phase directs the power or speed ranges to the feed rod, the entire set of speeds being included for each use and these thread feeds and carriage feeds being readily visible on a direct reading dial associated with the lever.

It is a still further object to arrange the feed gear box so as to provide a reservoir of oil associated with the cone of gears and causing operation of these gears in a bath of oil, whereby the transmission is self lubricating.

It is a still further object to provide an extremely efficient tumbler unit and shifting means for obtaining the invertible gear changes relative to the cone of gears and preferably to fully enclose this tumbler means in the feed gear box.

Other objects and certain advantages will be more fully set forth in a description of the accompanying drawings, in which.

Figures 1, 23:
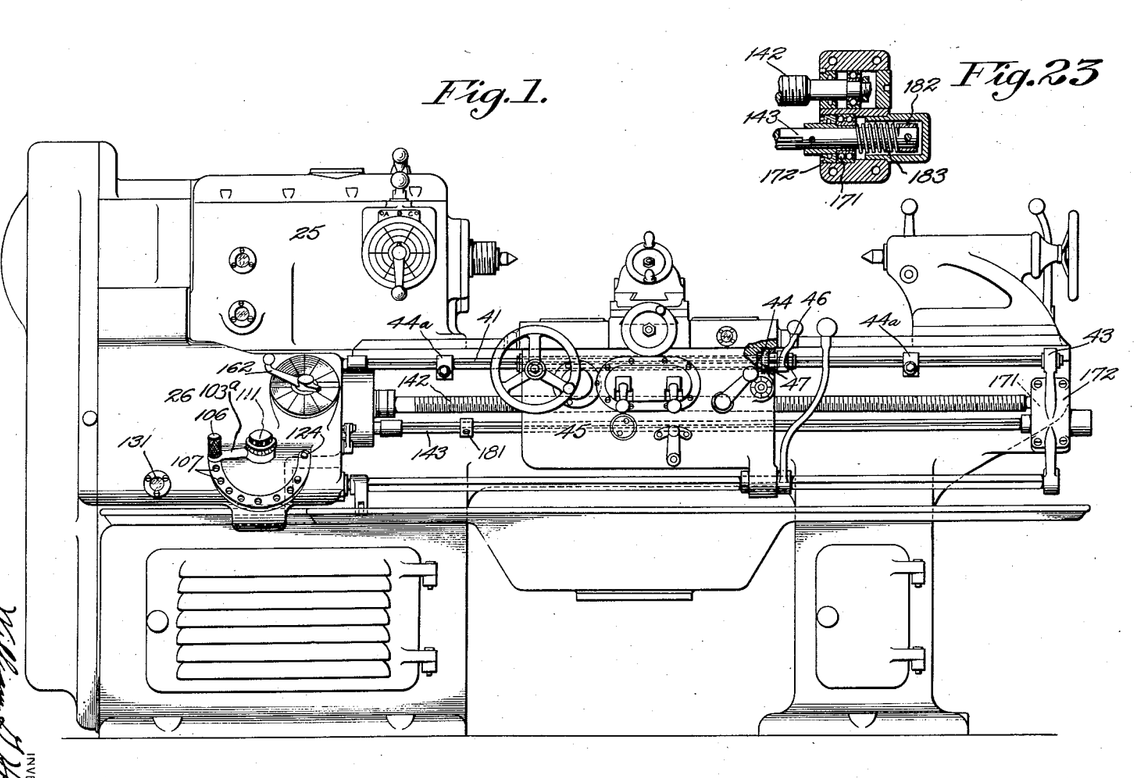
Figure 1 is a side elevation of a lathe illustrating the improved feed box and its driving connection to the carriage.
Figure 23 is a sectional view of the outer end bracket for the screw shaft and feed shaft illustrating the shiftable mounting for the respective shafts.

The improved feed box of this invention and the screw shaft and feed shaft thereof are herein fully illustrated in detail and their relation to the general parts of the lathe shown in Figure 1. The feed box derives its power from the headstock of the lathe but since the headstock of the lathe forms no part of this invention, only that much of the headstock necessary to an understanding of the manner of taking the power therefrom has been detailed.

Figures 2, 3:
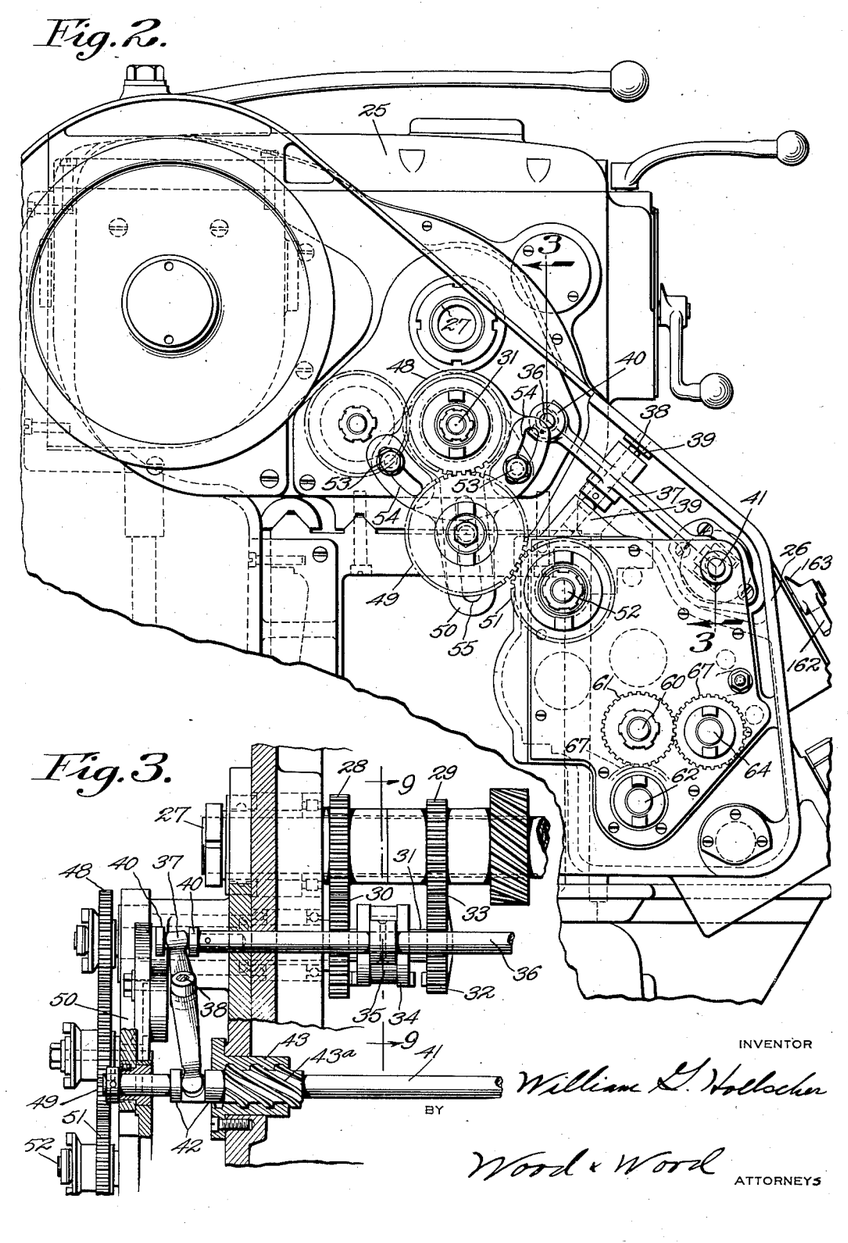
Figure 2 is a fragmentary view of the headstock end of a lathe illustrating the general arrangement of the transmission shaft centers and showing the feed box relative to the headstock.
Figure 3 is a sectional view taken on line 3—3, Figure 2, depicting, in detail, the power transmission extending from the spindle of the headstock to the feed box and showing the power control connection.
Figure 4:
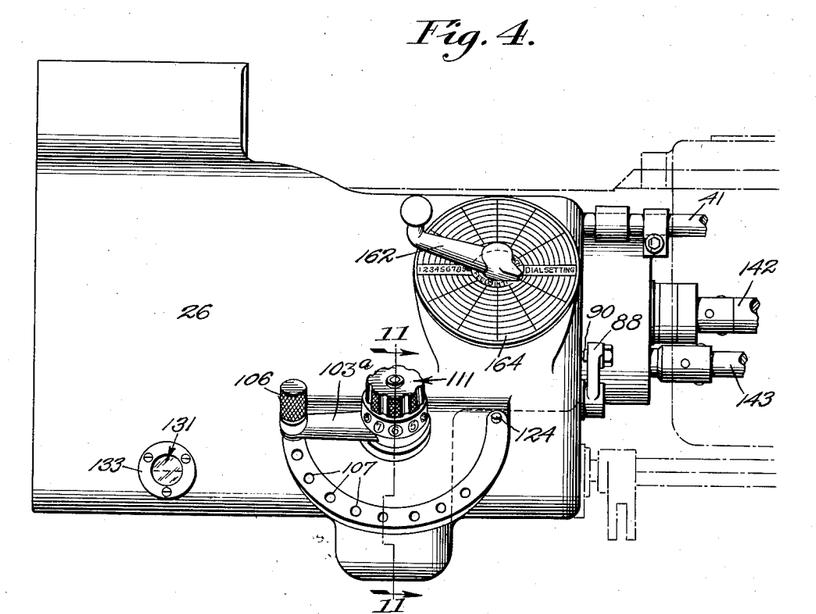
Figure 4 is a side view of the improved feed box apart from the lathe.

Referring to Figures 2 and 3 of the drawing, the headstock of the lathe is generally indicated at 25 and the feed box at 26. As shown in Figure 3, the spindle 27 of the lathe has spaced apart gears 28, 29 fixed thereto within the outer end of the headstock. One of these gears 28 is in mesh with a gear 30 fixed on a stub shaft 31 extended through the outer end of the headstock casing and the other gear is in mesh with a second gear 32 on this stub shaft through the medium of an idler or reversing gear 33.

The two gears 30, 32 mounted on the stub shaft 31 are loose thereon and a clutch element 34 is mounted therebetween in splined driving connection with the stub shaft, this clutch element including teeth on its opposite ends respectively alternately engageable with cooperating teeth on the loosely mounted gears 30, 32 or adapted to be positioned in intermediate or neutral position, this clutch element constituting the driving connection from the spindle to the stub shaft. A shifting yoke 35 (see Figures 3 and 9) is carried by a shift rod 36 mounted in parallelism with the stub shaft and in the walls of the headstock casing, this yoke engaging the clutch element and the shift rod extending beyond the outer end of the headstock casing.

A connecting lever 37 is fulcrumed on a journal pin 38 fixed between bosses 39 of the feed box casing at the end thereof and has one end of yoke form straddling a portion of the outer end of the shift rod between abutment collars 40 and the opposite end of yoke form straddling a portion of a manually operated shift rod 41 between respective abutments 42 thereof. The manually operated shift rod 41 extends along the side of the lathe (see Figure 1) is journalled in bearings 43 at the ends of the lathe and passes through the feed box and through sleeve 44 rotatably mounted in the carriage 45.

The shift rod 41 has screw threads 43ᵃ formed thereon having an extremely coarse pitch and engaged in screw threads in the bearing bracket 43 at the head end of the lathe. Due to the pitch of the thread either rotation or translation of the rod 41 results in longitudinal shift thereof and appropriate movement of the control clutch 34.

The sleeve is fixed against longitudinal movement in the carriage and is in splined connection with the rod 41. A shifting lever 46 is fixed thereto. This lever is rotatably journaled in the carriage, and is effective due to the splined connection, for rotating the rod and longitudinally shifting the same. The lever is translated with the carriage, due to abutments 47 thereof, fixing the same to the sleeve. Consequently, the control of the power to the feed box is readily accessible to the operator at all times. The carriage movement is also automatically controlled by engagement of the carriage sleeve 44 with dogs 44ᵃ at either side thereof on the rod 41 causing translation of the rod and operation of the clutch 34 for a set carriage movement.

The power is carried to the feed box from the stub shaft 31 by means of a gear 48 fixed on the extended end of the stub shaft. The gear 48 is in mesh with a shiftable gear 49 journalled in a swinging quadrant 50 for swinging the gear 49 into engagement with a gear 51 on a shaft 52 of the feed box at the outside thereof (see Figures 2 and 7). The quadrant is rotatably mounted on the shaft 31 and is fixed in position by means of screws 53 of the headstock disposed through concentric slots 54 in the quadrant concentric with the axes of the shaft 31. The gear 49 of the quadrant 50 is journalled in a radial slot 55 and may therefore have its axis shifted radially relative to the quadrant axis in the event of change in the size of the gear 48 for speed variation. This gear 48 and gears 49 and 51 may be varied as to size when the thread pitch or lead is to be varied as for diametral pitch leads, module leads, etc.

The shaft 52 is suitably journalled in the feed box casing and has a gear 56 fixed thereto in the gear box for driving a gear 57 fixed on a shaft 58. This gear 57 in turn drives a gear 59 of a compound gear loosely journalled through the wall of the feed box casing in bearings on a shaft 60.

*Invertible drive for cutting U. S. standard and metric threads*

From the outer gear 61 of the compound gear the drive is directed either to a shaft 62 carrying a cone of gears 63 or to a shaft 64 carrying a gear 65 as a part of a tumbler unit and constantly meshing with a swinging tumbler gear 66 adapted to drive any one of the gears 63 of the cone. The transfer of the drive between the gear cone shaft 62 and the tumbler gear shaft 64 is accomplished by means of a transposable gear 67 adapted to be fixed on the end of either shaft 62 or 64 at the extended ends thereof outside the feed box casing. The axes of the shafts 62 and 64 are equidistant from the axis of the gears 59, 61 and consequently the gear 67 of appropriate diameter will mesh with gear 61 in either position. This demountable gear 67 is readily slid on to keys 68 in the ends of the respective shaft and is held against the bearing 69 of the particular shaft by means of a wing nut 70. The shaft not carrying the gear 66 is equipped with spacer collars 71 and a wing nut 70.

By means of the transposable gear it is possible to drive the cone gear shaft 62 direct and to impart this drive through the tumbler gear to shaft 64 on through to the feed screw and feed shaft through transmission hereinafter described; or to invert the drive and drive the tumbler gear shaft 64 direct to impart a drive to the cone gear shaft 62 and thence on through to the feed screw and feed shaft.

Through this drive arrangement, the ratio of the gearing may be completely inverted and two sets of speeds of entirely different value transmitted to the feed screw and feed shaft. Through this transfer and inversion of drive it is possible to obtain a drive for cutting U. S. standard threads when the drive takes place from the tumbler shaft to the cone shaft and to cut metric or English threads when the drive takes place from the cone shaft to the tumbler shaft.

Figure 7:
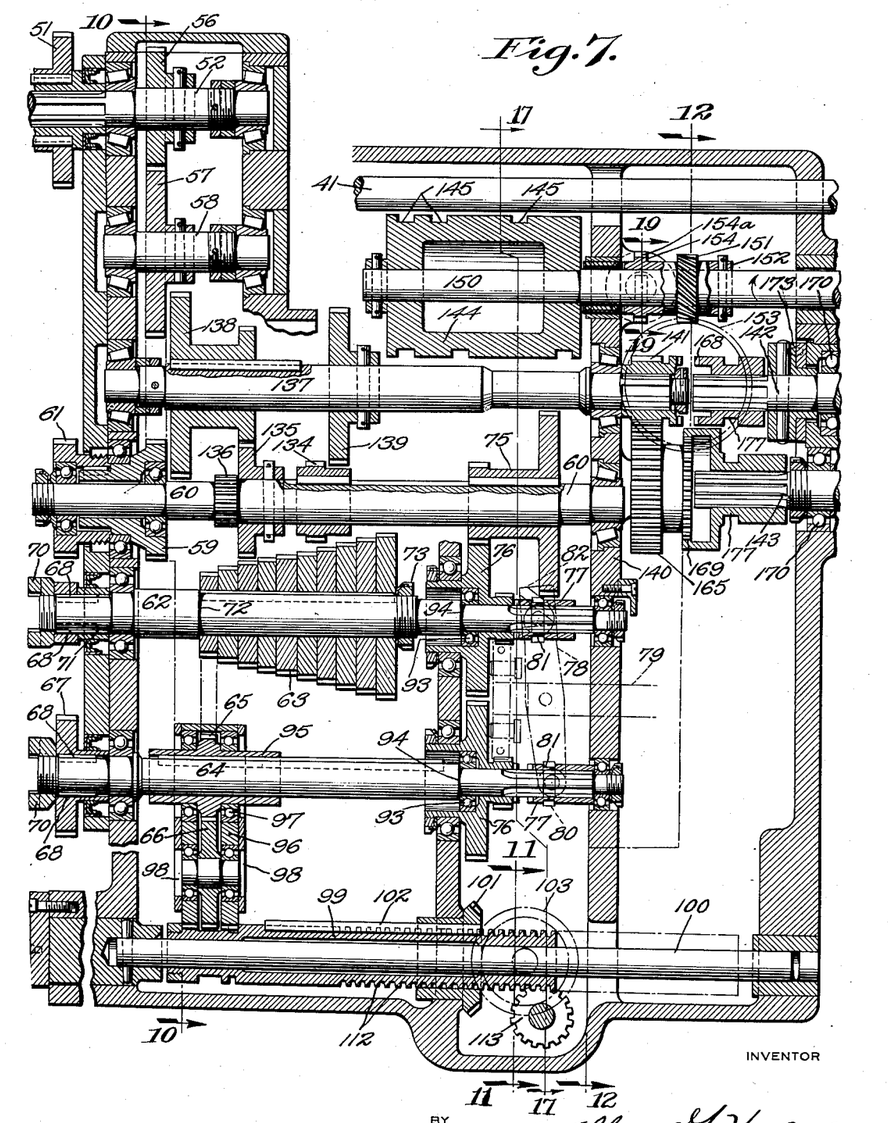
Figure 7 is a general view of the feed box transmission showing the gearing spread out for the purpose of illustrating all the shafting and the entire power transmission from the power intake to the feed screw and feed shaft.

The cone of gears are keyed in position on the shaft and are held in a cluster against a shoulder 72 thereof by means of a nut 73. The line of drive imparted ultimately through the cone shaft or tumbler shaft, as the case may be, is directed to a shaft 60 for further speed change, this particular shaft loosely supporting the compound gear 59, 61 which brings in the drive initially to the transposable gear. A compound gear 75 is mounted on this shaft and is shiftable for engagement of its respective gears with component gears of duplicate compound gears 76 loosely mounted on the cone shaft and the tumbler shaft respectively. These duplicate gears 76 are arranged to have their corresponding gears simultaneously in mesh with the common component gear of the compound gear. As shown in Figure 7, the large gears of the duplicate compound gears 76 are in mesh with the small gear of the compound gear.

Both the cone shaft and the tumbler shaft carry clutches 77 which are duplicates and disposed in splined connection with the shafts. These clutches are adapted to have clutching engagement with their respective gears through component teeth and are controlled by a single lever 78 and interlocked so that only one can be in clutching position at a particular time.

The single shifting lever 78 is fulcrumed on the end of a support rod 79 fixed in the frame of the feed box. Each end of this lever carries a swinging shifting yoke 80 in engagement with an annular groove 81 in the respective clutch element. One end of the fulcrumed lever includes a slotted head, the slot 82 being diagonally disposed in the head. A rotatable operating rod 83 is mounted in the walls of the feed box in a fixed journal sleeve 84 and includes a headed inner end 85 carrying a roller 86 fixed on a diametrically disposed journal stud 87 and engaged in the diametric slot 82. The head end 85 of the operating rod 83 lies against the inner end of the sleeve 84 and a manipulating lever 88 is fixed on the outer end of the rod and lies against the outer end of the sleeve.

This manipulating lever moves between a pair of apertures 89 in the feed box end wall registering with these apertures causing setting of the respective clutches for transfer of the drive. A screw 90 threaded through the end of the manipulating lever 88 is insertable in these respective apertures when aligned therewith for fixing the lever in the respective clutching positions. The respective clutches are thus arbitrarily engageable for correspondingly continuing the drive as determined by the position of the transposable gear which directs the drive either to the cone shaft or the tumbler shaft. When the drive is delivered directly to the cone shaft, the clutch at the end of the tumbler shaft is in and when the tumbler shaft is being driven directly the drive is continued through the clutch on the cone shaft. An abutment element 91 is fixed on the inner end of the support rod 79 and carries adjustable abutment screws 92 engaging against the end faces of the alternately clutched gears at the ends of the cone shaft and the tumbler shaft for maintaining the gears against their bearings 93 and the bearing 93 against the shoulder 94 of the respective shafts.

*Tumbler mechanism for controlling the speed changes derived from the cone of gears*

Figure 10:
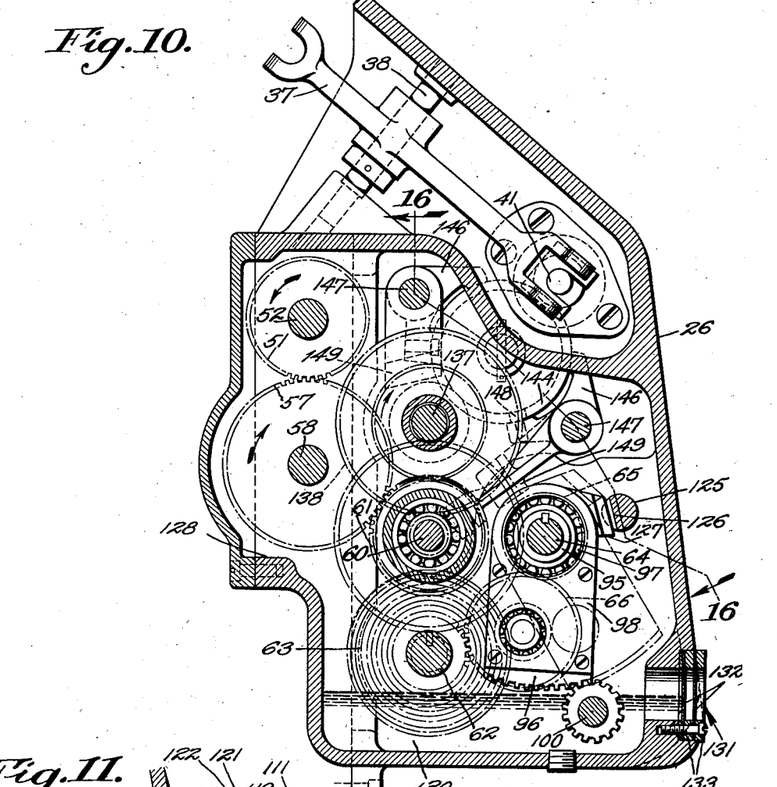
Figure 10 is a sectional view taken on line 10—10, Figure 7, showing the general arrangement of the gearing and shafting within the feed box.
Figure 11:
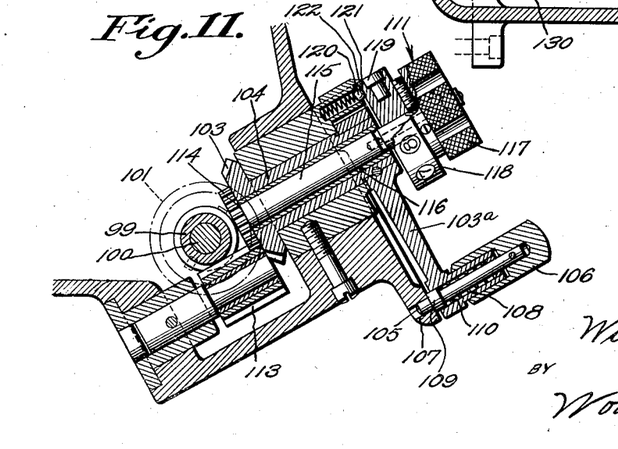
Figure 11 is a view taken on line 11—11, Figure 7, illustrating the compound control lever for controlling the speeds imparted to the screw shaft and feed shaft from or through the cone of gears for inversion of speeds.

The tumbler mechanism for changing the speeds is located in the forward side of the feed box and is therefore controlled from the forward side of the lathe (see Figures 7, 10 and 11). The tumbler unit includes the gear 65 previously mentioned having a sleeve-like hub 95 in splined connection with the tumbler shaft, the swinging tumbler gear 66 journalled in ball bearings and a tumbler frame 96 journalled on the axis of the tumbler shaft and upon the gear hub 95 on ball bearings 97 at each side of the gear 65. The tumbler frame is in the form of a segmental gear and the mentioned ball bearings are held in place by means of plates 98 attached at each side of this segmental gear element.

The segmental gear of the tumbler is in mesh with gear teeth formed in a sleeve 99 mounted on an axial support rod 100 fixed in the feed box frame. This sleeve 99 is rotatably translatably mounted, the translative movement being for the purpose of locating the tumbler gear adjacent the particular gear of the cone and the rotative movement being for the purpose of swinging the gear 66 into mesh with the selected gear of the cone. For this purpose of swinging the gear into mesh, a bevel gear 101 is loosely journalled in the wall of the feed box in splined connection upon the sleeve 99 by means of a long key 102, this bevel gear meshing with a companion bevel gear 103 journalled in a bearing sleeve 104 fixed in the front wall of the feed box casing.

The hub of this companion gear 103 has a lever 103ª fixed thereto at the front face of the feed box, this lever including a detent 105 in its handle 106 swinging across and registering with an arcuately arranged series of detent apertures 107 in the frame. The detent 105 is manipulated by means of the handle 106 telescopically mounted on a sleeve 108 integrally formed at the outer end of the lever 104. This handle carries the detent 105 extended through the integral sleeve 108, the tip of this detent engaging with the particular aperture. A shoulder 109 is provided for limiting insertive movement of the pin as impelled by a spring 110 under compression between the shoulder 109 and the closed outer end of the integral sleeve portion 108 of the lever 104. There is a detent aperture for each gear of the cone and it will be apparent that swinging the lever from one detent aperture to another will accomplish the engagement of the tumbler gear with the adjacent gear of the cone, the apertures fixing the amount of swing of the tumbler gear for the particular gear mesh.

The tumbler gear is set in position adjacent the particular gear by means of a knob 111. For transmitting the motion from the knob 111, circular teeth 112 are cut in the sleeve 99 and a gear 113 journalled in the frame is disposed in mesh with said teeth. An actuating gear 114 fixed on the inner end of the knob shaft 115 engages this last mentioned gear. The knob shaft is journalled in a sleeve 116 within the hub and on the axis of the bevel gear. The outer end of the shaft 115 carries the knob 111 which has a knurled outer end 117 and an inner flange 118 having its peripheral face displaying numbers corresponding to the order and number of the cone gears and each provided in the outer end of a stud insert 119 in the peripheral face.

A detent 120 is mounted in the journal bearing and is adapted to selectively register with recesses 121, one in back of each number of the knob. There is a stationary indicating point 122 formed as a part of the journal bearing and overhanging the peripheral face of the knob. The tumbler shifting sleeve is loosely mounted for translation through the rotatable bevel gear. When a gear shift is desired, the operator swings the hand lever entirely to the right abutting a stop pin 124 at the end of the series of detent apertures 107, thus throwing the tumbler gear well out of line of mesh with any of the gears of the cone.

As the operator desires to mesh the tumbler gear with a particular gear of the cone of gears, the first operation is to rotate the knob 111 to the particular gear number desired, this rotation of the knob 111 translating the tumbler shifting sleeve 99 and carrying the tumbler unit therewith due to the fact that the tumbler teeth are inset into the sleeve 99 sufficiently for providing lateral abutment as at 123.

After the gear of the tumbler has been set adjacent the particular gear of the cone, the operator then rotates the tumbler swinging handle 106 and this motion is imparted for rotating the sleeve 99. The segmental element of the tumbler frame then swings the tumbler gear into mesh with the adjacent gear of the cone. This permits the handle 106 to be moved to a particular detent aperture 107 corresponding to the position of the gear.

In order to prevent any displacement of the tumbler unit after the tumbler gear is in mesh, a notched rod 125 is fixed in the feed box walls. This rod has ten notches 126, in its rear side, one opposite to each gear of the cone. A lug 127 is formed on the tumbler unit and as the tumbler unit is swung into position of mesh, this lug enters and registers with the particular notch adjacent the gear of the cone being driven or driving, thereby stabilizing the tumbler against accidental sidewise displacement (see Figures 10 and 16).

The tumbler gear is shown in mesh with the smallest gear of the cone, the drive at this time being either the highest or the lowest speed obtainable from the cone, the inversion depending on whether or not the line of drive is coming direct to the cone shaft or direct to the tumbler gear shaft. The lower part of the feed box depends below the gear openings 128 in the back of the box and provides a well or reservoir 130, the cone of gears being disposed so as to partially depend, as to all the gears thereof, in the pool of oil and to thereby cause a general oiling of all of the gears in the box. The level of the oil is visible through a sight gauge 131 consisting of spaced glass discs 132 held in place by means of frame rings 133.

*Secondary speed and feed change gearing and control*

The compound gear 75 is slidably mounted on its shaft 60 and a single gear 134 is also splined on the shaft. Besides these splined gears 75, 134, a pair of gears 135, 136 are fixed to the shaft. From this shaft the drive extends to a further shaft 137 which has a compound gear 138 splined thereon which includes component gears for the fixed gears on the first mentioned shaft 60. A fixed gear 139 is also included on this further shaft 137 and is adapted to be meshed by the slidable single gear 134 on the first shaft. From this further shaft which is journalled in the outer end wall and the inner wall 140 of the feed box, the drive is extended beyond the inner wall 140 by means of a gear 141 rotatably fixed on the extended end of the shaft, from which gear the drive is imparted either to the lead screw 142 or the feed rod 143.

The invertible set of ten speeds taken from the cone of gears is further multiplied by six ranges in the transmission just described. For instance, two ranges may be obtained by the use of the slidable compound gear 75 on the first shaft 60 which is shifted to mesh with either the large gears of the compound gears 76 of the cone shaft and tumbler shaft or the small gears of the compound gears. Two ranges are thus imparted to the first shaft 60. Between the first shaft 60 and further shaft 137 these ranges are multiplied by three further changes, thus accomplishing six ranges of speed for the ten gears of the cone. The three changes are accomplished at the further shaft by either shifting the compound slidable gear 138 of the further shaft into mesh with the respective component stationary gears 135, 136 on the first shaft or shifting the slidable single gear 134 of the first shaft 60 with the stationary gear 139 of the further shaft 137.

Figures 8, 9:
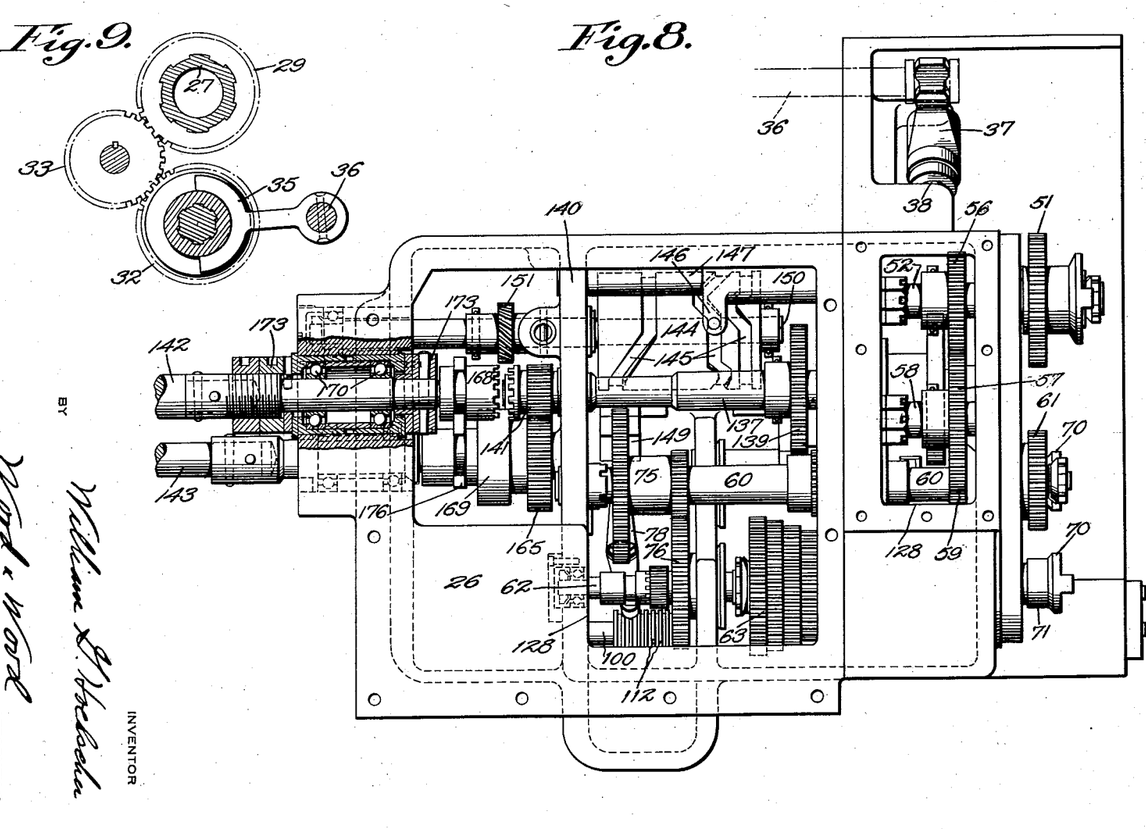
Figure 8 is a rear inside view of the feed box, showing it removed from the machine.
Figure 9 is a sectional view taken on line 9—9, Figure 3, illustrating the power reversing extension from the spindle and the means for controlling the power.
Figure 16:
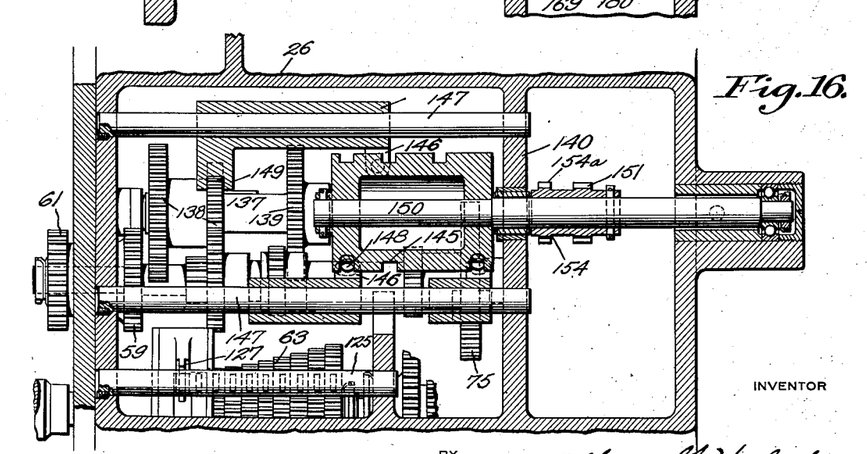
Figure 16 is a view taken on line 16—16, Figure 10, illustrating the cam and levers for accomplishing the secondary set of speed changes.
Figure 17:
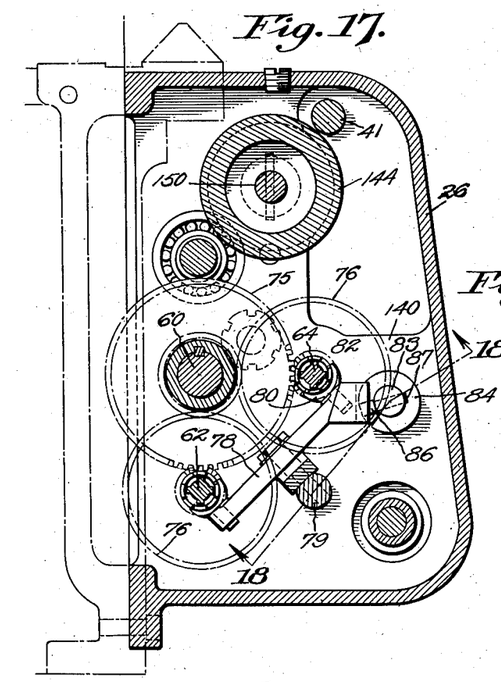
Figure 17 is a sectional view taken on line 17—17, Figure 7, showing the general arrangement of the gearing and illustrating the shifting device for changing from metric to U. S. standard threads or feed, or vice versa.
Figure 18:
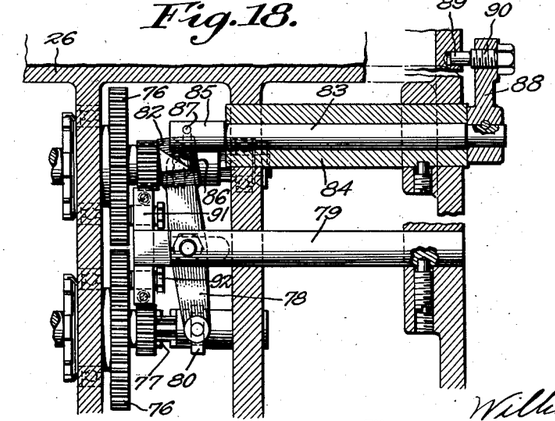
Figure 18 is a sectional view taken on line 18—18, Figure 17, further detailing the shifting means of Figure 17.
Figure 19:
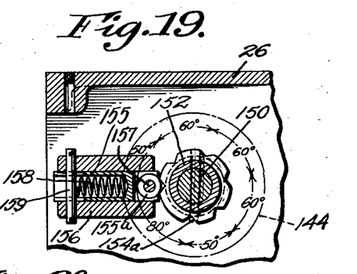
Figure 19 is a sectional view taken on line 19—19, Figure 7, illustrating the detent arrangement for maintaining the speed change cam in set position.
Figures 20, 21:
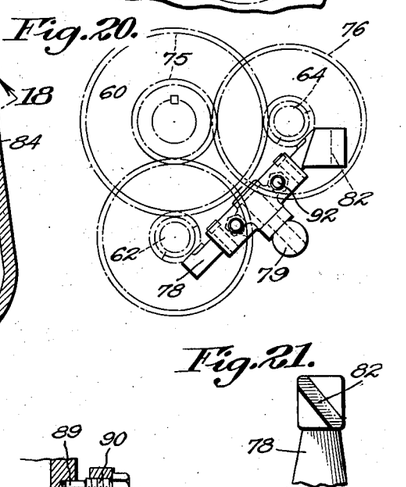
Figure 20 is a fragmentary detail view further illustrating the details of the shifting means for changing from metric to U. S. standard threads or feeds, or vice versa.
Figure 21 is a fragmentary detail view of one end of the shift lever illustrating the formation of its head for its operative connection.

These speed ranges are controlled by means of a multiple grooved cam 144 including a groove 145 for each shiftable gear of which there are three and a lever 146 for each shiftable gear and groove (see Figures 8, 10 and 16). These levers are slidably mounted on rods 147 and have rollers 148 engaging the respective grooves and forks 149 engaging the respective gears. The multiple cam is fixed on a shaft 150 journalled in the walls of the feed box and has a spiral gear 151 fixed thereon having an elongated hub 152. The spiral gear is in mesh with a spiral gear 153 for rotating the cam shaft and controlling the positions of the gears through the levers and appropriate cam grooves.

The hub of the gear fixed on the cam shaft includes a notched flange 154 having a series of detent grooves 154$^a$ around its periphery corresponding in number to the positions of the gears, namely six.

A detent 155 is mounted for cooperation with the notched peripheral flange, being supported in a lug 156 of the feed box adjacent the peripheral flange. The detent 155 consists of a hollow plunger having a bifurcated operative end carrying a roller 155ᵃ mounted on a transverse pin 157 parallel to the axis of rotation of the cam, this roller adapted to engage the notches. The detent plunger is held in operative position by means of a coil spring 158 under compression within the hollow plunger and between its head end and an abutment pin 159 fixed in the lug traversing diametrically disposed grooves in the plunger, the slots being of appropriate length for proper clearances.

The cam is rotated by means of the previously mentioned spiral gears 151, 153, the second of which is keyed on the inner end of a control shaft 160 journalled in a bearing element 161 fixed in the forward wall of the feed box and carrying a manipulating knob 162 which includes an indicator point 163. The indicator point moves relative to readings on a dial plate 164 fixed to the forward face of the feed box, this dial being detailed in Figure 6.

In view of the fact that the drive controlled by this cam is imparted either to the lead screw 142 or the feed rod 143, a control has been arranged so as to direct the speeds to either shaft and is inclusive of means transferring the drive from one to the other of these shafts operated by the same lever which controls the speeds.

Figures 12, 13, 14, 15:
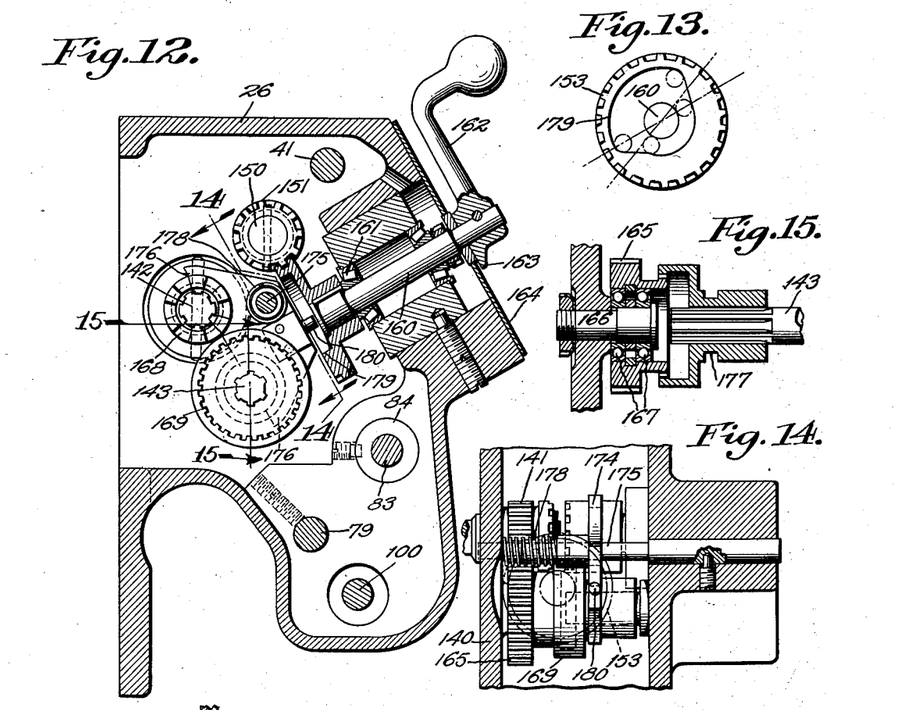
Figure 12 is a sectional view taken on line 12—12, Figure 7, illustrating the control lever for further speed changes beyond the first control lever or speed inversion.
Figure 13 is a rear view of the cam and gear for controlling the secondary speed range and the selective direction of the power to the feed screw and feed rod.
Figure 14 is a sectional view taken on line 14—14, Figure 12, detailing the selective means for driving either the feed screw or the feed rod.
Figure 15 is a sectional view taken on line 15—15, Figure 12.

The gear 141 on the further shaft 137 which has been described as transmitting the ultimate drive to the lead screw or the feed shaft is in constant mesh with a gear 165 loosely rotatably journalled on a stub shaft 166 on ball bearings 167, the axis of this gear being in alignment with the feed rod 143 (see Figures 7 and 15). The lead screw is in alignment with the further shaft 137 and clutch elements 168, 169 are provided in splined engagement with the lead screw and feed rod respectively on the ends adjacent the further shaft and the stub shaft. The lead screw and feed rod extend the length of the lathe between respective bearings 170 in the feed box and bearings 171 in a joint bearing bracket 172 at the tailstock end of the lathe. The lead screw is fixed against longitudinal movement by means of collars 173 on each side of the feed box bearing (see Figure 8), whereas the feed shaft is adapted for a limited translative movement for the purpose of automatic control as will be later set forth.

*Control knob and dial for directing speed ranges to either the feed screw or the feed shaft*

The clutch element 168 of the lead screw is of the toothed type and is adapted to cooperate with teeth on the end of the adjacent gear, whereas the clutch element 169 of the feed rod is in the nature of an internal gear engageable with an external gear formed on the driving gear 165 supported on the stub shaft 166. Therefore, engagement of the respective clutches is accomplished by shifting the same on their respective shafts. For accomplishing this shifting, a shifting yoke 174 is mounted on a slide rod 175 fixed in the feed box, this yoke having its respective yoke ends 176 engaging in annular grooves 177 in the respective clutch elements so that these elements are operated simultaneously.

As shown in Figure 7, the clutch elements are so arranged as to provide a drive to the lead screw when both are shifted to the left, this shifting moving the clutch element 169 of the feed rod out of engagement. The yoke element 174 moves against a spring 178 under compression on the rod 175 and is normally held in position with the feed rod clutch 169 in engagement.

A cam groove 179 is provided in the back of the control gear 153 of the control shaft 160 and operation of the shifting yoke is accomplished by camming engagement of a pin 180 thereof with the outer wall of the groove. The gear ratio of the cam rotating transmission has been arranged so as to provide for two rotations of the cam for each rotation of the knob. During rotation of the knob (see Figure 6) over the lower half of the dial, the shifting yoke 174 is unaffected and the drive is imparted to the feed shaft. However, as the upper half of the dial is entered by the knob indicator, the second revolution of the cam occurs and the second set of speed changes are then directed to the lead screw. This is accomplished by the contour of the cam groove, the groove being reduced in radius over this half (see Figure 13) for shifting the yoke 174 moving the feed rod clutch 169 out of engagement and the lead screw clutch 168 into engagement.

Figure 6:
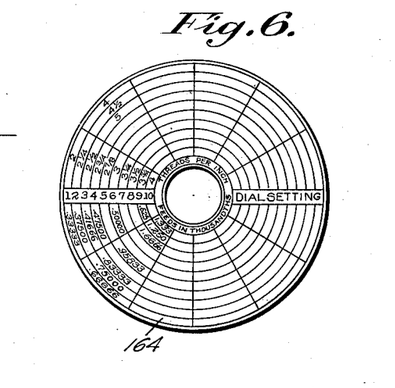
Figure 6 is a detail view of the dial plate illustrating the arrangement of the feed readings.

It will be apparent that the yoke is always urged to the right by the spring 178 and consequently the pin 180 thereof is always held against the outer periphery of the cam groove 179. Consequently, through the same knob or lever 162 it is possible to dial a complete set of speed changes for the feed shaft and a complete set of speed changes for the screw shaft in one rotation of the knob. The dial shown in Figure 6 is replaceable with a metric system dial if the English system is desirable.

*Automatic control means on the feed rod for disconnecting the carriage feed*

Figure 22:
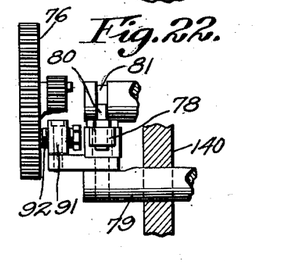
Figure 22 is a further detail of the shifting means.

The feed rod, as has been previously stated, is longitudinally shiftable (see Figures 7 and 22). The shifting occurs when the carriage reaches the left hand end of its travel. For this purpose a dog 181 is fixed on the feed rod and is engaged by the carriage for shifting the feed shaft. The feed rod at the tailstock end is slidably mounted in the ball bearing 171 and carries a fixed collar 182 on its extreme end engaged against a spring 183 under compression and lying against the bearing. This spring holds the shaft in its normally operated position. Inasmuch as the cam groove provides ample clearance for inward movement of the pin 180 of the shifting yoke 174 when in the feed rod operating position, it is then possible for the feed rod to be shifted to the left by the carriage for disengaging the clutch and thereby discontinuing the power to the carriage.

*General control operation of feed box*

Figure 5:
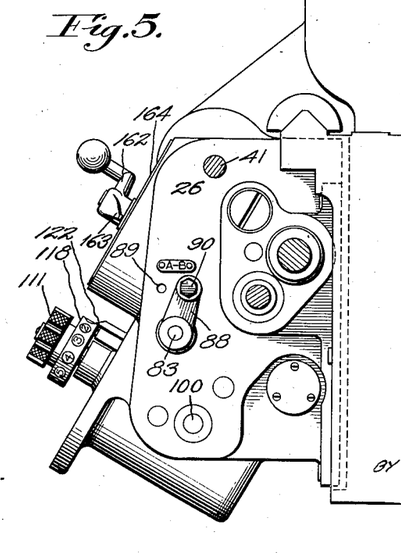
Figure 5 is an end view thereof.

In converting the lathe for cutting the respective types of thread, two gear changes are made. If U. S. standard threads are to be cut, transposable gear 67, as one change, is placed on the shaft 64 and the drive then progresses from gear 61 to gear 67, shaft 64, tumbler gear 66, thence to the cone of gears 63, shaft 62, and to the speed range transmission, this position of the transposable gear being shown in Figure 7. As the second or concurrent change with the transposition of this gear, a lever 78 must then be shifted by means of handle 88 to indicated point B (see Figure 5), whereby the particular clutch 77 is shifted and engaged with gear 76 of shaft 62 delivering the drive to the gear 75 of the speed range transmission.

If metric threads are desired, the gear 67 is placed on shaft 62 and the drive then progresses from cone gear shaft 62 to tumbler gear shaft 64, the handle 88 then being moved to indicate A (see Figure 5) and the clutch on shaft 64 is thereby engaged. It will be apparent that these changes result in complete inversion of the drive since in one case the tumbler shaft drives the cone shaft and in the other case the cone shaft drives the tumbler shaft.

The tumbler lever 104 and the knob 111 accomplish selective engagement of the tumbler gear with a gear of the cone for the speed changes as previously set forth. A dial 164 is consulted for speed range and the handle 162 is set for the particular speed range desired. A given thread cutting operation being desired, the particular threads per inch or leads in millimeters are obtained by setting the handle 164 with its indicator 163 in the particular circumferential division or marking on the dial indicating the particular threads per inch or leads in millimeters. At the same time the knob 111 is set at the number (1—10) corresponding to the number of the circle on the dial plate 164 in which the particular threads per inch or lead in millimeters is found.

There are six thread cutting ranges of ten speeds each fully displayed and indicated at the upper half of the dial plate. The movement of the lever 162 across the upper half accurately controls thread cutting. Movement of the lever 162 across the lower half of the dial transfers the drive from the lead screw to the feed rod and the same ranges of speed are then obtainable for carriage feeds in thousands or millimeters as desired and procured through the conversion mechanism heretofore described.

Having described my invention, I claim:

1. In a transmission, a driving gear, parallel shafts, a transposable gear adapted to be fixed on the end of either of said shafts and to mesh with said driving gear in either position, a cone of gears fixed to one of said shafts, a tumbler gear rotatively fixed to the other of said shafts and adapted for selective engagement with the gears of the cone, a speed range transmission, a gear loosely mounted on each of the respective shafts and both meshing with a particular gear of the speed range transmission, and alternately operable clutches associated with the respective shafts and controlled for connecting the particular shaft not carrying the transposable gear to the loosely mounted gear for extending the drive to the speed range transmission, the position of said transposable gear adapted to constitute the shafts alternately driving and driven shafts relative to each other.

2. In a transmission, a driving gear, parallel shafts, means for connecting the driving gear to either of said shafts, a large gear fixed to one of said shafts, a small gear fixed to the other of said shafts and adapted for engagement with the gear of the first shaft, a speed range transmission, a gear loosely mounted on each of the respective shafts and both meshing with a particular gear of the speed range transmission, and alternately operable clutches associated with the respective shafts for connecting the particular shaft not being initially driven to the loosely mounted gear on that shaft for extending the drive to the speed range transmission.

3. A feed box gearing, comprising, a driving gear, parallel shafts, one of said shafts having a cone of gears fixed thereto, the other of said shafts having a tumbler gear fixed for rotation therewith, transposable means for connecting the driving gear either to the cone gear shaft or to the tumbler shaft, control means for meshing the tumbler gear with a selected one of the cone gears, duplicate gears loosely mounted on each of said shafts, a further transmission adapted to be driven from either of said shafts including a gear in mesh at all times with both of said duplicate gears, clutch elements splined on the shafts, clutch parts associated with each of the duplicate gears for cooperation with the clutches, a fulcrumed lever having its ends respectively operatively connected to the clutches, and a control handle adapted to swing said fulcrumed lever and move one of said clutches into engagement and the other out of engagement.

4. In a feed box gearing, a driving gear, parallel shafts, one of said shafts having a large gear fixed thereto, the other of said shafts having a small gear fixed for rotation therewith, transposable means for connecting the driving gear to either of said shafts, duplicate gears, one loosely mounted on each of said shafts, a further transmission adapted to be driven from either of said shafts including a gear in mesh at all times with both of said duplicate gears, clutch means mounted on said shafts for connecting the shafts to the gears, a lever operatively connected to the clutch means, and a control handle for moving said lever and engaging the clutch means with one shaft and disengaging the clutch means from the other shaft.

5. In a feed box, parallel shafts, a cone of gears fixed on one of said shafts, a tumbler gear splined on the other of said shafts, a rotatively translatively mounted sleeve, a toothed connection between said tumbler gear and said sleeve for rotation and a translative connection therebetween, a rack formed on said sleeve, a gear engaging said rack for moving the tumbler gear longitudinally of the cone of gears into positions adjacent the respective gears of the cone, a lever having rotative connection to said sleeve, a knob mounted on the same axis as the lever and fixed to said rack engaging gear for setting the tumbler gear in a particular position, and respective detent means for fixing the knob and lever in the desired positions.

6. A lathe headstock gearing, convertible for transmitting varying speeds conformable for different cutting standards, comprising, a driving gear and driven gear, a pair of shafts, a transposable gear for said shafts for alternately connecting said driving gear to a selected one of said shafts, a gear for each shaft, each loose thereon and both in transmitting connection with said driven gear, clutch devices for selectively connecting said gears to their respective shafts, a series of stepped gears on one of said shafts and tumbler gearing connecting the second of said shafts with a selected one of said series of stepped gears, each shaft serving as a counter-shaft for the driven gear when receiving its motion from the other through one of the stepped gears and tumbler gearing.

7. A lathe headstock gearing, convertible for transmitting varying speeds conformable for different cutting standards, comprising, a driving gear and driven gear, a pair of shafts, a transposable gear for said shafts for alternately connecting said driving gear to a selected one of said shafts, a gear for each shaft, each loose thereon and both in transmitting connection with said driven gear, clutch devices for selectively connecting said gears to their respective shafts, a large gear on one of said shafts and a small gear on the other of said shafts, each shaft serving as a counter-shaft for the driven gear when receiving its motion from the other through the small gear or the large gear.

8. In a feed box, parallel shafts, a cone of gears fixed on one of said shafts, a tumbler gear splined on the other of said shafts, a lever having a rotative connection to said tumbler gear for swinging said tumbler gear into and out of engagement with the respective gears of the cone, said lever having an axial mounting through the wall of the feed box, and a knob disposed adjacent to the lever and mounted on the same axis as the lever and having a translative connection to said tumbler gear for moving the tumbler gear longitudinally of the cone of gears.

9. In a transmission, a plurality of shiftable change gears, a gear shifter for said change gears, shafts adapted to be alternately driven by said transmission, a clutch for each of said shafts for connecting the transmission thereto, a clutch shifter for coincidentally operating said clutches for disengaging the drive from one shaft when the drive is connected to the other shaft, and a common lever for operating said gear shifter and said clutch shifter, said lever adapted to move said gear shifter through two cycles of movement during one revolution of the lever and adapted to shift the clutch shifter for accomplishing drive to one shaft during one cycle and drive to the other shaft during the other cycle.

10. In a transmission, a plurality of shiftable gears, a common means for shifting said shiftable gears, two shafts, said shafts adapted to be alternately driven by said transmission, clutches for connecting the transmission to the respective shafts, means for coincidentally shifting said clutches for disengaging the drive from one shaft when the drive is connected to the other shaft, a common lever for operating said gear shifting means and said clutch shifting means, and an indicator plate associated with the common lever for showing all speeds of drive to the respective shafts.

11. In a transmission, a plurality of shiftable gears, a common means for shifting said shiftable gears, shafts adapted to be alternately driven by said transmission, clutches for said shafts respectively for connecting the transmission thereto, a shifting lever connected to both of the clutches for simultaneously shifting the same, spring means for normally holding the shifting lever and clutches in position with the clutch for one shaft engaged, the clutches arranged for disengagement of said last mentioned clutch when the other clutch is engaged, a common lever for shifting said clutch shifting lever and said common gear shifting means, said common lever adapted to move said gear shifting means through two complete cycles of gear shifts during one revolution of the common lever and including coincidentally operated means for operating the clutch shifting lever, said means connecting the clutch to one shaft during one cycle of gear shifts and connecting the clutch to the other shaft during the other cycle of gear shifts.

12. In a transmission including a plurality of shiftable feed change gears, a common means for shifting said shiftable gears, shafts adapted to be alternately driven by said transmission, clutches for the respective shafts for connecting the transmission thereto, and a common lever for concurrently shifting said clutches and operating said common gear shifting means.

13. In a transmission including a plurality of shiftable gears, a device for shifting said shiftable gears, shafts alternately driven by said transmission, clutches for connecting the transmission to the respective shafts, a clutch shifting device for alternately operating said clutches for disengaging the drive from one shaft when the drive is connected to the other shaft, and vice versa, and a lever having operative connection to the gear shifting device and the clutch shifting device for moving the gear shifting device through two cycles of movement and alternating the clutches for each cycle of gear changes in a single cycle of movement of the lever.

WILLIAM G. HOELSCHER.